(12) United States Patent
Suzuki et al.

(10) Patent No.: US 6,236,192 B1
(45) Date of Patent: May 22, 2001

(54) AC VOLTAGE REGULATOR

(75) Inventors: Yasunobu Suzuki, Tokyo; Isao Sugawara, Saitama, both of (JP)

(73) Assignees: I-Hits Laboratory, Kanagawa; Chiyoda Corporation, Saitama, both of (JP)

( * ) Notice: Subject to any disclaimer, the term of this patent is extended or adjusted under 35 U.S.C. 154(b) by 0 days.

(21) Appl. No.: 09/589,361

(22) Filed: Jun. 8, 2000

(30) Foreign Application Priority Data

Jun. 10, 1999 (JP) .................................................. 11-163842

(51) Int. Cl.[7] .................................. G05F 1/10; G05F 1/26
(52) U.S. Cl. ........................................... 323/239; 323/263
(58) Field of Search ................................... 323/239, 259, 323/263, 344

(56) References Cited

U.S. PATENT DOCUMENTS

| | | | |
|---|---|---|---|
| 3,573,604 | * | 4/1971 | Lundgreen ............................... 363/85 |
| 3,582,765 | * | 6/1971 | McCabe ................................. 323/263 |
| 3,987,357 | * | 10/1976 | Edstrom et al. ....................... 323/271 |
| 4,168,476 | * | 9/1979 | Petrizio ................................. 323/300 |
| 4,716,357 | * | 12/1987 | Cooper ................................. 323/263 |
| 4,791,348 | * | 12/1988 | McGuire et al. ...................... 323/263 |
| 4,853,608 | * | 8/1989 | Schrade ................................. 323/258 |
| 5,545,971 | * | 8/1996 | Gomez et al. ......................... 323/259 |
| 5,714,821 | * | 2/1998 | Dittman ................................ 310/179 |
| 6,020,726 | * | 2/2000 | James ................................... 323/239 |
| 6,055,165 | * | 4/2000 | Drobnik ................................. 363/44 |

* cited by examiner

*Primary Examiner*—Adolf Deneke Berhane
(74) *Attorney, Agent, or Firm*—Wenderoth, Lind & Ponack, LLP.

(57) ABSTRACT

An AC voltage regulator, which not only has a fast response speed with respect to input voltage fluctuations but also is small in size and light in weight and is capable to boost an input voltage, comprises a high-frequency transformer 4, a first bi-directional semiconductor switch circuit 3, a second bi-directional semiconductor switch circuit 5 and a third bi-directional semiconductor switch circuit 6; an input AC voltage is ring-modulated by the first bi-directional semiconductor switch circuit 3 and the obtained ring-modulated voltage is transformed at a high frequency by the high-frequency transformer 4 and then demodulated by the second bi-directional semiconductor switch circuit 5, and the obtained AC demodulated voltage is added to the input AC voltage to produce an AC raised voltage, and the AC raised voltage is pulse width modulated by the third bi-directional semiconductor switch circuit 6, which is controlled to become ON only while the second bi-directional semiconductor switch circuit 5 is OFF, and the AC raised voltage is continuously regulated by continuous regulation of a duty ratio D of the second bi-directional semiconductor switch circuit 6 in the pulse width modulation.

8 Claims, 12 Drawing Sheets

(a)

(b)

AC VOLTAGE REGULATOR

FIELD OF THE INVENTION

This invention relates to an AC voltage regulator, and more particularly, to a new AC voltage regulator which is small and lightweight and has superb efficiency and power factor.

BACKGROUND OF THE INVENTION

A prior art AC (=alternating current) voltage regulator (also called sliding voltage regulator), commonly known as 'slidac', has, for example, a circuit configuration shown in FIG. 1 or FIGS. 2(a) and 2(b).

The AC voltage regulator shown in FIG. 1 is a typical example of mechanical type. With this mechanical type, it is general that the voltage regulation is carried out manually, but there have also been commercially available those which detect an output voltage with a controller A and maintain a constant voltage automatically by means of a reversible motor (not shown).

However, for example, the prior art AC voltage regulator of mechanical type with manual voltage regulation of 1 KVA has a weight of about 8 kg and the prior art AC voltage regulator of mechanical type with motor-driven automatic voltage regulation of 1 KVA has a weight of as much as 12 kg, thus the prior art regulator is very heavy, and also its response speed with respect to input voltage fluctuation is very slow because of its mechanical control.

In order to increase the response seeed, there has been developed an AC voltage regulator which performs a pulse width control, that is, an On/Off control of AC voltage waveform using a high-speed semiconductor switch.

FIG. 2(a) is a circuit diagram showing an example of an AC voltage regulator of this electronic control type. In the AC voltage regulator of the electronic control type shown in FIG. 2(a), a controller B controls a semiconductor switch C and second semiconductor switch D to be ON and OFF alternately, and with this ON/OFF alternation, a pulse width control of an AC input voltage $E_0$ is performed, thereby controlling continuously an output voltage $E_0D$ from around zero voltage to the vicinity of the input voltage $E_0$ by varying a duty ratio D from substantially zero to 1. In this case, for example, an AC voltage regulator of an 1 KVA output with a weight of about 4 kg has been realized, thus the electronic control type is much lighter than the mechanical control type and also has an improved response speed with respect to input voltage fluctuation.

However, such a prior art AC voltage regulator of electronic control type has problems relating to boosting of its input voltage.

In order to raise the output voltage higher than the input voltage, for example, it is necessary to add a low-frequency step-up transformer D as shown in FIG. 2(b), and as a result, the volume and the weight of the AC voltage regulator increase considerably and the advantages of it being an electronic-control-type are reduced to the sole merit that its response speed with respect to input voltage fluctuation is fast.

SUMMARY OF THE INVENTION

Accordingly, an object of the invention is to solve the problems described above and provide an AC voltage regulator which not only has a fast response speed with respect to input voltage fluctuation but also is small in size and light in weight with an ability to boost its input voltage.

BRIEF DESCRIPTION OF THE DRAWINGS

The foregoing and other objects, features and advantages of the present invention will be better understood from the following detailed description, taken in conjunction with the accompanying drawings, in which.

DETAILED DESCRIPTION OF THE INVENTION (Embodiment 1)

Figure 1:
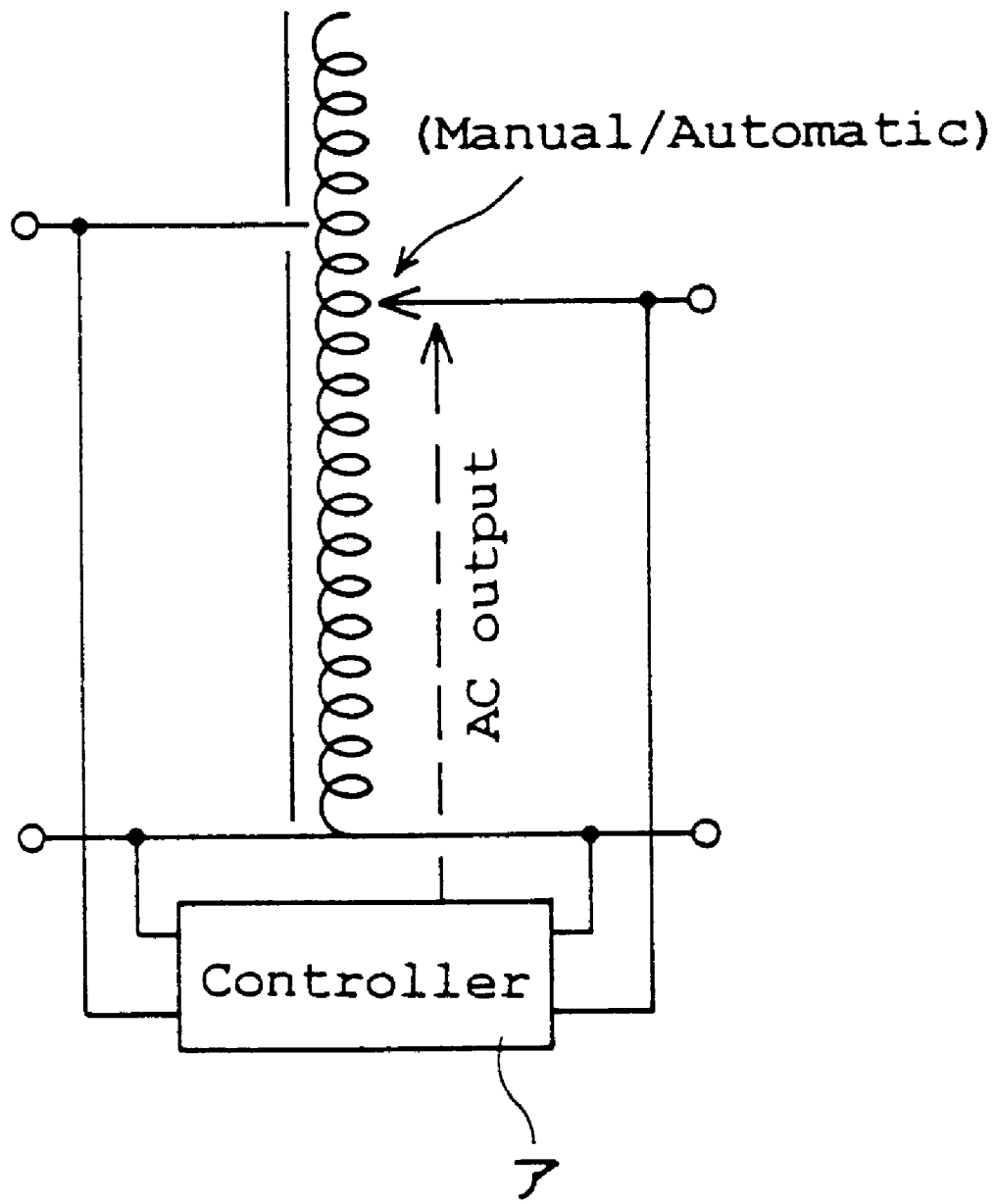
FIG. 1 is a circuit diagram of a prior art AC voltage regulator of mechanical control type.
Figure 3:
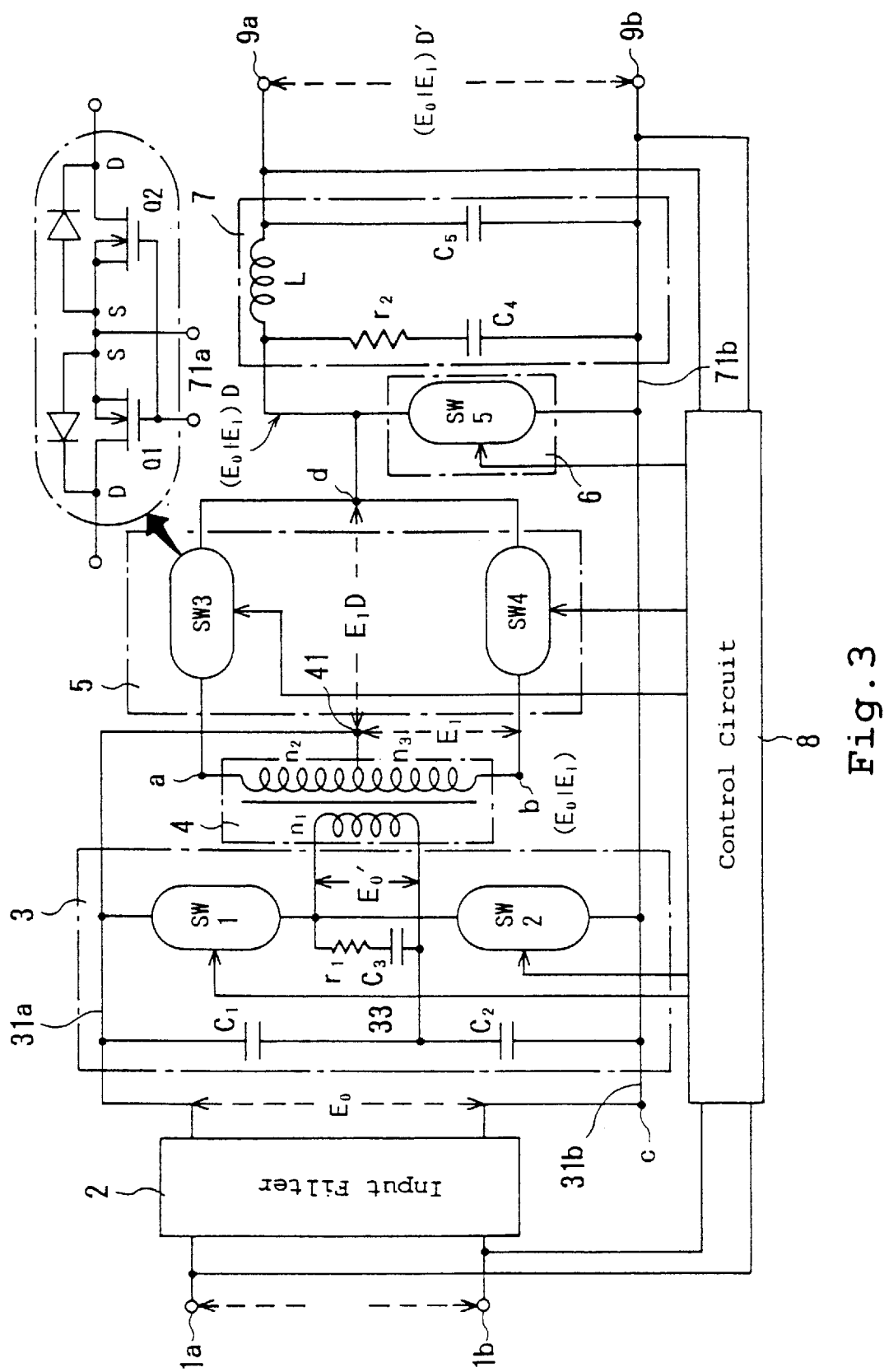
FIG. 3 is a circuit diagram of a first preferred embodiment of an AC voltage regulator of the invention.

FIG. 3 shows a first preferred embodiment of an AC voltage regulator according to the invention. In FIG. 3, 1a and 1b are AC input terminals connected to an AC power supply (not shown) or the like; 2 is an input filter; 3 is a first bi-directional semiconductor switch circuit made up of bi-directional semiconductor switches SW1 and SW2 connected in a half bridge; 4 is a high-frequency transformer; 5 is a second bi-directional semiconductor switch circuit made up of bi-directional semiconductor switches SW3 and SW4 connected in a two-phase half wave bridge; 6 is a third bi-directional semiconductor switch circuit having a bi-directional semiconductor switch SW5; 7 is a high-frequency filter made up of a coil L and a capacitor C5; 8 is a control circuit; and 9a and 9b are AC output terminals.

In the first bi-directional semiconductor switch circuit 3 in this preferred embodiment, capacitors C1 and C2 connected to each other in series are connected in parallel between input terminals 31a and 31b; a common terminal 33 of these capacitors C1 and C2 is connected to one end of a primary coil of the high-frequency transformer 4; and an output terminal 32 of the bi-directional semiconductor switches SW1 and SW2 is connected to the other end of the primary coil of the high-frequency transformer 4. This first bi-directional semiconductor switch circuit 3 constitutes a high-frequency convertor of half-bridge type.

On a secondary coil side of the high-frequency transformer 4, a secondary coil is provided with a center tap 41, and this center tap 41 is connected to the AC input terminal 1a (or an output terminal of the input filter 2 in this preferred embodiment). Also, input terminals of the bi-directional semiconductor switches SW3 and SW4 of the second bi-directional semiconductor switch circuit 5 are respectively connected to output terminals a and b of the secondary coil of the high-frequency transformer 4.

Furhter, the bi-directional semiconductor switch SW5 is connected in parallel between an output terminal d of the second bi-directional semiconductor switch circuit 5 and a terminal c which is a common terminal (hereinafter, the input-output common terminal) of the AC input terminal 1b (or an output terminal of the input filter 2, in this preferred embodiment) and the AC output terminal 9b, thereby to form the third bi-directional semiconductor switch circuit 6. The high-frequency filter 7 is connected in parallel with this third bi-directional semiconductor switch circuit 6 and has its outputs coupled to the AC output terminals 9a, 9b.

Here, each of the bi-directional semiconductor switches SW1, SW2, SW3, SW4 and SW5 is, for example, as shown enlarged in FIG. 3, an AC switch made up of two unidirectional MOS-FETs Q1, Q2 connected back-to-back and having its gate/source driven in parallel. Of course, although in this preferred embodiment MOS-FETs are used, they may alternatively be IGBTs or other semiconductor switches. The bi-directional semiconductor switch SW5 of the third bi-directional semiconductor switch circuit 6 is an AC switch which operates as an AC flywheel.

The control circuit 8 is connected to the AC input terminals 1a and 1b and to the AC output terminals 9a and 9b and controls the drive of the bi-directional semiconductor switches SW1, SW2, SW3, SW4 and SW5.

In the AC voltage regulator of FIG. 3 having this circuit configuration, voltage regulation is carried out in the following way. Each of FIGS. 4(a), 4(b), 4(c), 4(d) and 4(e) shows an AC voltage waveform.

Figure 4:
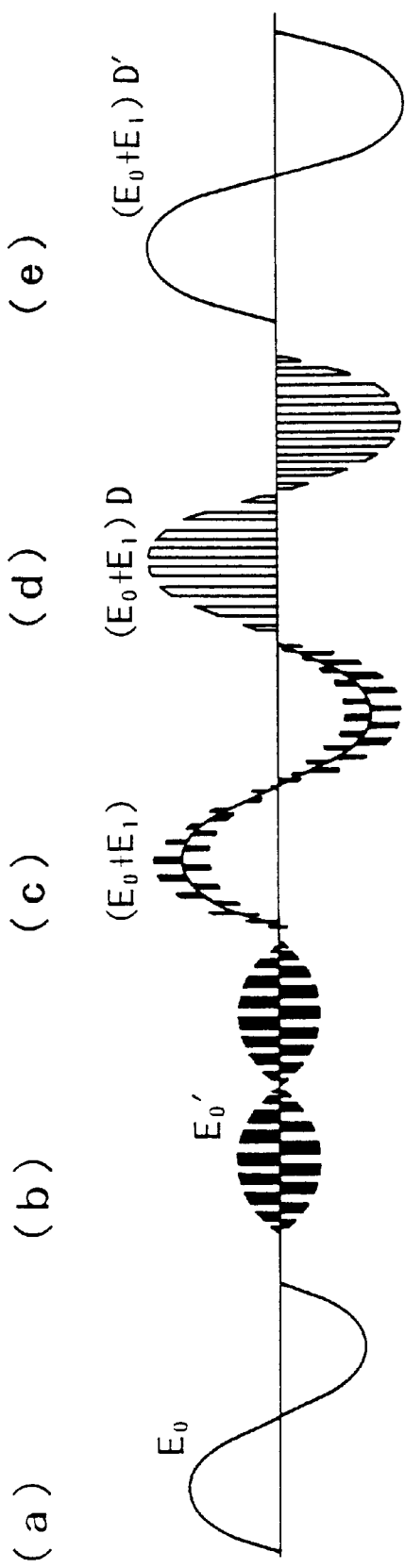
FIGS. 4(a)–4(e) each shows an example of a voltage waveform in the AC voltage regulator of FIG. 3.

First, the AC input voltage $E_0'$ having a waveform as shown in FIG. 4(a), after passing through the input filter 2, is ring-modulated by the first bi-directional semiconductor switch circuit 3. The ring-modulated voltage $E_0'$ has a ring-modulated waveform as shown in FIG. 4(b) and has a frequency range of 20 KHz to 100 KHz for example.

Then, this ring-modulated voltage $E_0'$ is applied to the primary coil of the high-frequency transformer 4 and transformed. The ring-modulated output voltage $E_1$ outputted from the secondary coil of the high-frequency transformer 4 is added to the input AC voltage $E_0$, and a raised voltage $(E_0+E_1)$ is synthesized between the output terminal a or b of the secondary coil of the high-frequency transformer 4 and the input-output common terminal c. An example of the waveform of this raised voltage $(E_0+E_1)$ is shown in FIG. 4(c). Here, for example, when the ratio of the primary and secondary windings of the high-frequency transformer 4 are set to be n1=n3, n2=n3 (the secondary coil being divided into n2 and n3 by the center tap 41), then $E_1/E_0'=n2/n1=n3/n1$.

Meanwhile, the ring-modulated output voltage $E_1$ is demodulated by the second bi-directional semiconductor switch circuit 5 having the raised voltage $(E_0+E_1)$ thus synthesized as its power supply, and this demodulated voltage and the input AC voltage $E_0$ are added together. That is, only when the bi-directional semiconductor switches SW3 and SW4 connected in two-phase half-wave bridge in the second bi-directional semiconductor switch circuit 5 are in additive phase, in other words when the voltage is high, the switches SW3 and SW4 is ON-driven, thereby an AC raised voltage is obtained. Thus, it can be said that the second bi-directional semiconductor switch circuit 5 fulfills the role of a demodulator and ON-switch for obtaining an AC raised voltage.

In FIG. 3, the terminal d on the output side of the second bi-directional semiconductor switch circuit 5 is a step-up(or boost) terminal at which the AC raised voltage arises. This step-up terminal d is coupled to one terminal of the third bi-directional semiconductor switch circuit 6 and to one input terminal of the high-frequency filter 7.

The bi-directional semiconductor switches SW1 and SW2 of the first bi-directional semiconductor switch circuit 3, the bi-directional semiconductor switches SW3 and SW4 of the second bi-directional semiconductor switch circuit 5 and the bi-directional semiconductor switch SW5 of the third bi-directional semiconductor switch circuit 6 are ON/OFF-driven by the control circuit 8 in coordination with their respective ON/OFF states shown as S1, S2, S3, S4 and S5 in FIGS. 5(a), 5(b), 5(c), 5(d) and 5(e), thereby an AC raised voltage $(E_0+E_1)$ D pulse width modulated with a duty ratio D (where D=0 to 1) is generated and further is smoothed by the high-frequency filter 7 so as to obtain the same waveform as the input AC frequency. A low-frequency AC output voltage $(E_0+E_1)D'$ is thereby obtained and is outputted to the AC output terminals 9a, 9b.

Here, the waveform shown in FIG. 4(d) is the AC raised voltage $(E_0+E_1)D$ of when the duty ratio D is approximately 1 and the output is near its maximum value. When this voltage is smoothed by the high-frequency filter 7, it becomes the AC output voltage $(E_0+E_1)D'$ having a waveform shown in FIG. 4(e). Consequently, it can be seen that an AC voltage raised above the input AC voltage $E_0$ is obtained.

In the regulator of FIG. 3, the pulse width modulation is carried out as follows.

Figure 5:
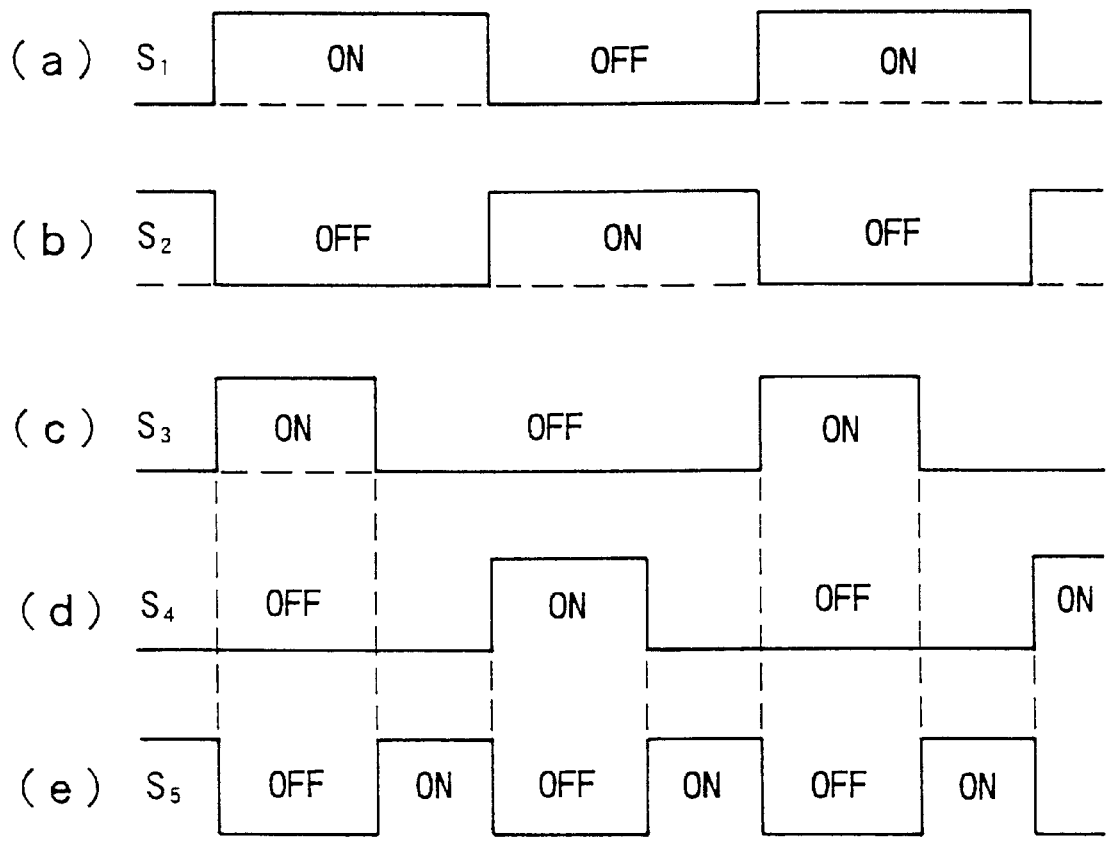
FIGS. 5(a)–5(e) each shows an example of a switch drive waveform of each of the bi-directional switches.
Figure 6:
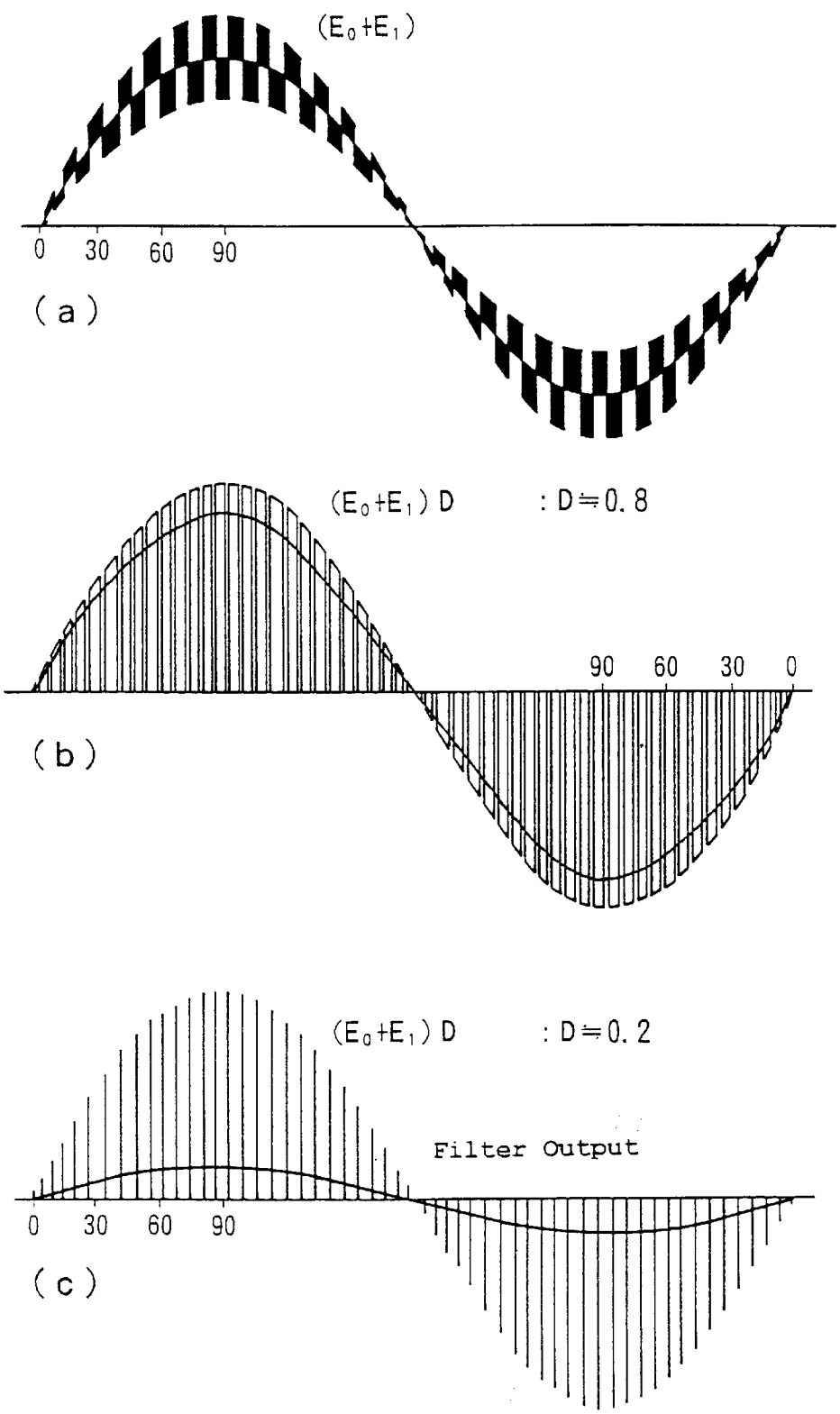
FIGS. 6(a)–6(c) each show an example of a waveform of an AC raised voltage and pulse width modulated AC raised voltages.

First, the waveform shown in FIG. 6(a) is an example of the waveform of the raised voltage $(E_0+E_1)$ between the output terminal a or b of the secondary coil side of the high-frequency transformer 4 and the input-output common terminal c. Suppose that the bi-directional semiconductor switches SW3 and SW4 of the second bi-directional semiconductor switch circuit 5 are ON/OFF-driven alternately with the duty ratio D as shown by S3 of FIG. 5(c) and S4 of FIG. 5(d), and the bi-directional semiconductor switch SW5 of the third bi-directional semiconductor switch circuit 6 is driven at an interval of (1-D) at all times as shown by S5 of FIG. 5(e), or in other words is switched ON only when the second bi-directional semiconductor switch circuit 5 is OFF. Then, the waveform of the input side of the high-frequency filter 7, that is the AC raised voltage $(E_0+E_1)D$, assumes the output waveform shown in FIG. 6(b) or FIG. 6(c) in accordance with the duty ratio D. The waveform of FIG. 6(b) is an example wherein the duty ratio D is approximately 0.8, and it can be seen that an AC voltage of 80% of the maximum value is obtained. The waveform of FIG. 6(c) is an example wherein the duty ratio D is approximately 0.2, and it can be seen that an AC voltage of 20% of the maximum value is obtained.

Accordingly, if the duty ratio D of the second bi-directional semiconductor switch circuit 5 is continuously adjusted from substantially 0 to 1, the AC output voltage can be controlled smoothly and continuously to a maximum value $E_0+E_1$ which is higher than the input AC voltage.

Figure 7:
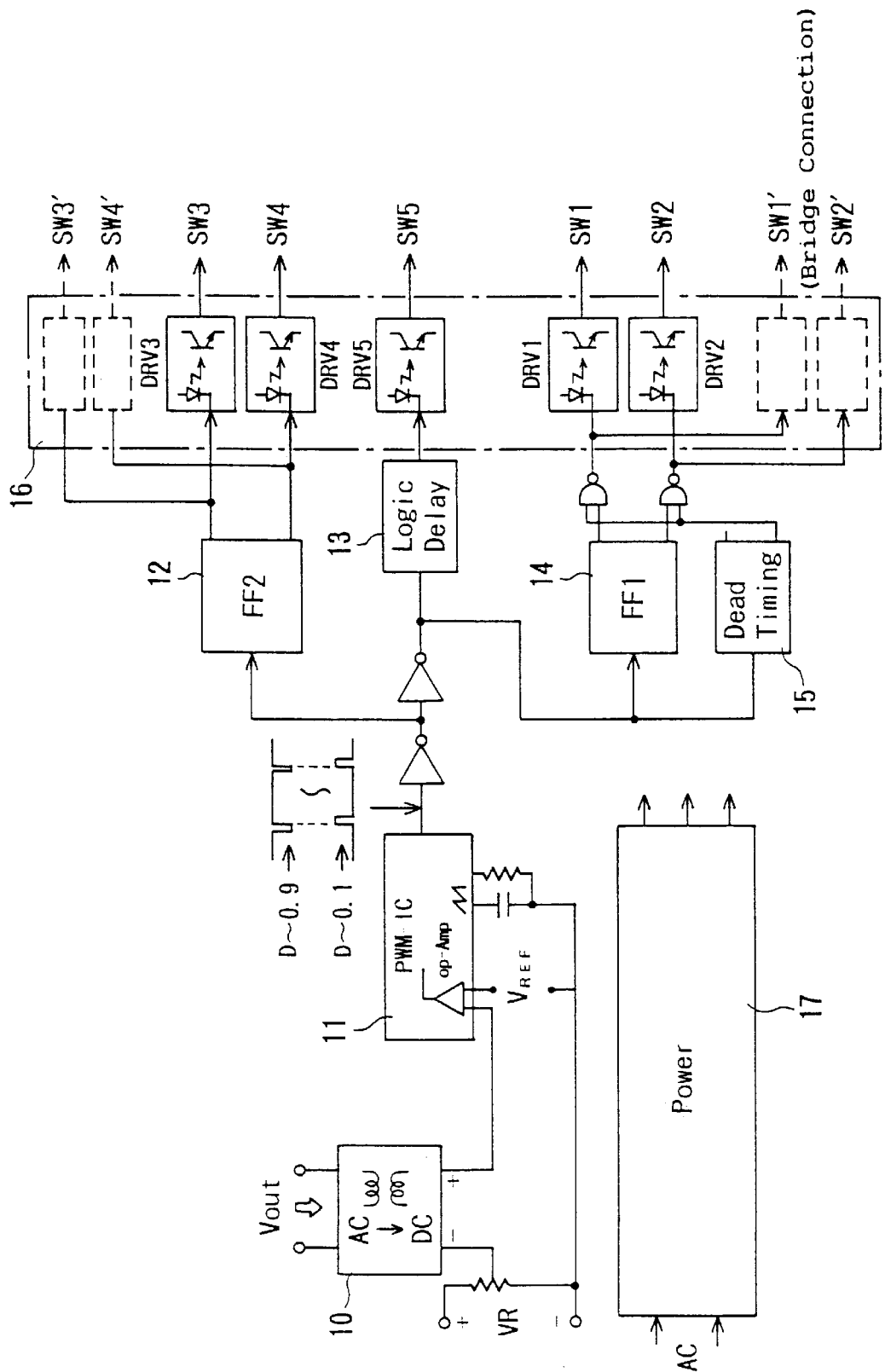
FIG. 7 is a block diagram of an example of a circuit configuration of a control circuit.

FIG. 7 shows an example of the circuit configuration of the control circuit 8. In FIG. 7, 10 is an AC output voltage detecting circuit; 11 is an IC (for example TL494CN) for pulse width control; 12 and 14 are flip flops; 13 is a signal delaying circuit; 15 is a delay time control IC (for example 74LS123N) for ensuring that the ON times of the bi-directional semiconductor switches SW1 and SW2 do not overlap in the slightest; 16 is a driving circuit for driving each of the bi-directional semiconductor switches SW1, SW2, SW3, SW4 and SW5 in insulation; and 17 is an AC power supply. In the example shown in FIG. 7, the driving circuit 16 performs insulation by means of a photo coupler, but of course any method capable of insulated-drive of the bi-directional semiconductor switches may be used.

In this control circuit 8, first, the AC output voltage $V_{out}$, i.e. $(E_0+E_1)D'$ is inputted into the AC output voltage detecting circuit 10 and converted into a DC voltage, and further is added to a potential of a variable resistance VR. Then, by the pulse width control IC 11, the voltage thus obtained is compared with a reference voltage $V_{REF}$, pulse width control is carried out, and variable setting of voltages outputted to the bi-directional semiconductor switches is realized. The bi-directional semiconductor switches SW1 and SW2 can be always switched ON alternately with a time obtained by subtracting a dead time from a duty ratio of 50%, using the delay time control circuit 15.

By this control circuit 8, the bi-directional semiconductor switches SW1–SW5 are controlled with the driving waveforms S1–S5 shown in FIGS. 5(a)–5(b). It is preferable in practice that the regulator or the control circuit 8 has a safety circuit such as an overcurrent protection circuit.

Also, in the AC voltage regulator of FIG. 3, a resistance r1 and a capacitor C3 are inserted in the first bi-directional semiconductor switch circuit 3 and a resistance r2 and a capacitor C4 are inserted in the high-frequency filter 7. The resistance r1 and capacitor C3 and also the resistance r2 and capacitor C4 form snubber circuits for suppressing spike pulses occurring on rising and falling of the pulse waveform, and according to the selection of their constants, the power loss of the AC voltage regulator and the withstand voltage of the bi-directional semiconductor switches SW1–SW5 become closely related.

In addition, when the input is limited to DC(=direct current), the AC voltage regulator can be operated by using, for example, an extremely small -capacity DC-DC convertor in the AC output voltage detecting circuit 10 of the control circuit 8 of FIG. 7.

(Embodiment 2)

In the AC voltage regulator according to the invention shown in FIG. 3, the high-frequency transformer 4 has a center tap 41 and the second bi-directional semiconductor switch circuit 5 is made up of bi-directional semiconductor switches SW3 and SW4 connected in a two-phase half-wave bridge. With this configuration, it is possible to reduce the number of bi-directional semiconductor switches and obtain an economical circuit configuration suitable for a small capacity.

Figure 8:
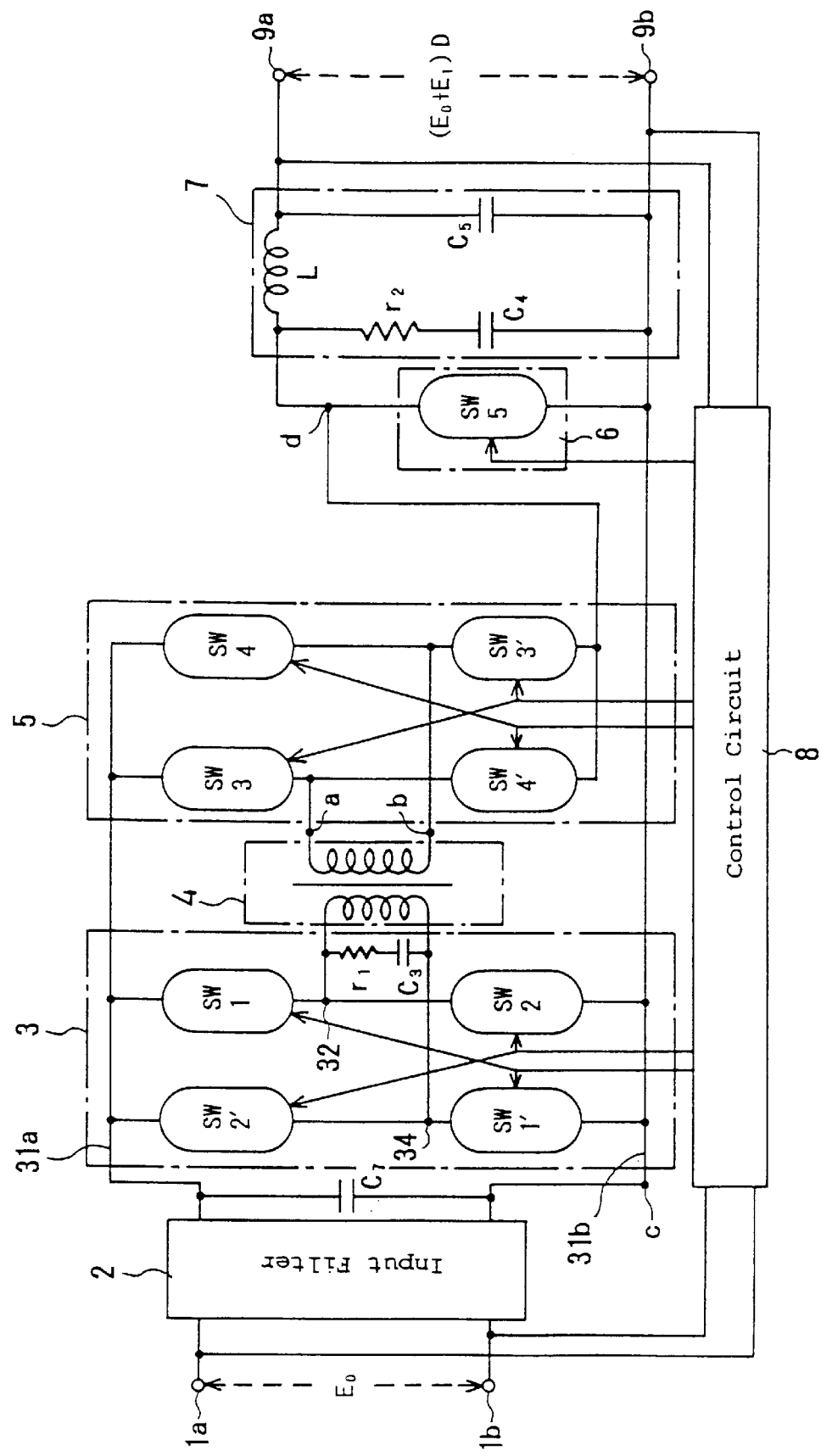
FIG. 8 is a circuit diagram of another preferred embodiment of an AC voltage regulator of the invention.

On the other hand, in order to make the second bi-directional semiconductor switch circuit 5 suitable for a large capacity, for example as shown in FIG. 8, it is preferable to have a circuit configuration of a full-wave bridge formed by not providing a center tap in the high-frequency transformer 4 and by connecting the bi-directional semiconductor switches SW3, SW4, SW3', SW4' in a single-phase full-wave bridge. In this case, the first bi-directional semiconductor switch circuit 3 is also a full-wave bridge circuit configuration with the bi-directional semiconductor switches SW1, SW2, SW1', SW2', the output terminal 32 of the bi-directional semiconductor switches SW1 and SW2 is connected to one end of the primary coil of the high-frequency transformer 4, and to the other end, an output terminal 34 of the bi-directional semiconductor switches SW1' and SW2' is connected. The capacitors C1 and C2 are not used; instead, a capacitor C7 is provided between the output terminals of the input filter 2. In the second bi-directional semiconductor switch circuit 5, the input terminals of the bi-directional semiconductor switches SW3 and SW4' and the input terminals of the bi-directional semiconductor switches SW3' and SW4 are connected to the output terminals a and b of the secondary coil of the high-frequency transformer 4, respectively.

Of course, in the same way as the above-described circuit configuration of FIG. 3, these bi-directional semiconductor switches can be ON/OFF-controlled by the control circuit 8, and it is possible to realize continuous pulse width control of an AC raised voltage by continuously regulating the duty ratio D of the high-frequency transformer 4.

(Embodiment 3)

Figure 9:
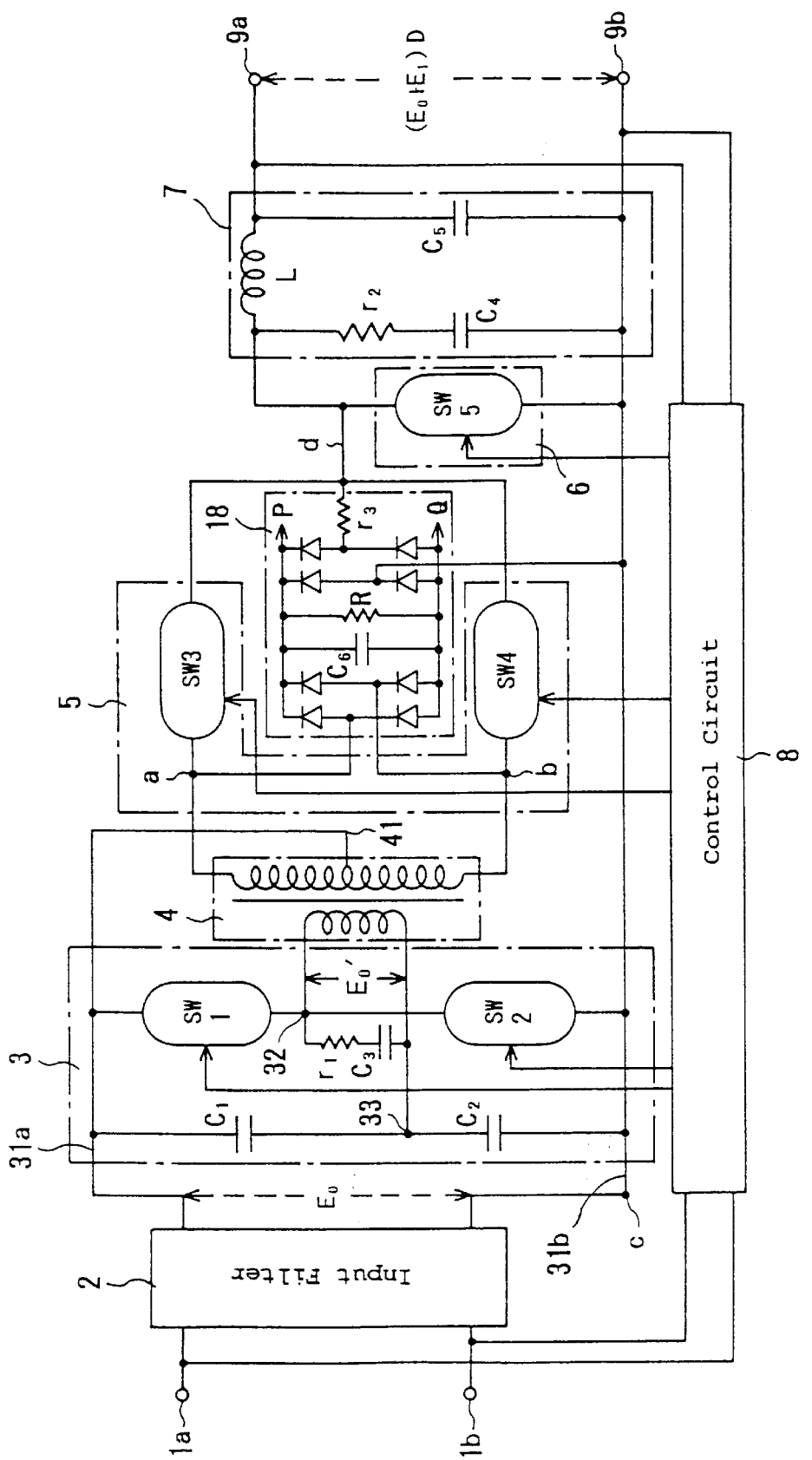
FIG. 9 is a circuit diagram of another preferred embodiment of an AC voltage regulator of the invention.

FIG. 9 is a circuit diagram of another preferred embodiment of an AC voltage regulator according to the invention.

In the AC voltage regulator shown in FIG. 9, a four-phase full-wave rectifier 18 is provided as a spike pulse reducing circuit for reducing spike pulses. The output terminals a and b of the high-frequency transformer 4, the input-output common terminal c, and the raised voltage terminal d are connected to the four AC input terminals of the four-phase full-wave rectifier 18, respectively. And also, a spike-absorbing capacitor C6 and a discharge resistor R are each connected in parallel to the DC output of the four-phase full-wave rectifier 18. With this configuration, spike pulses can be reduced efficiently, and also, because the snubber circuit on the output side, that is the capacitor C4 and the resistance r2, needs only to absorb extremely small pulses which cannot be removed by the four-phase full-wave rectifier 18, losses of the rectifier as a whole can be reduced.

(Embodiment 4)

Figure 10:
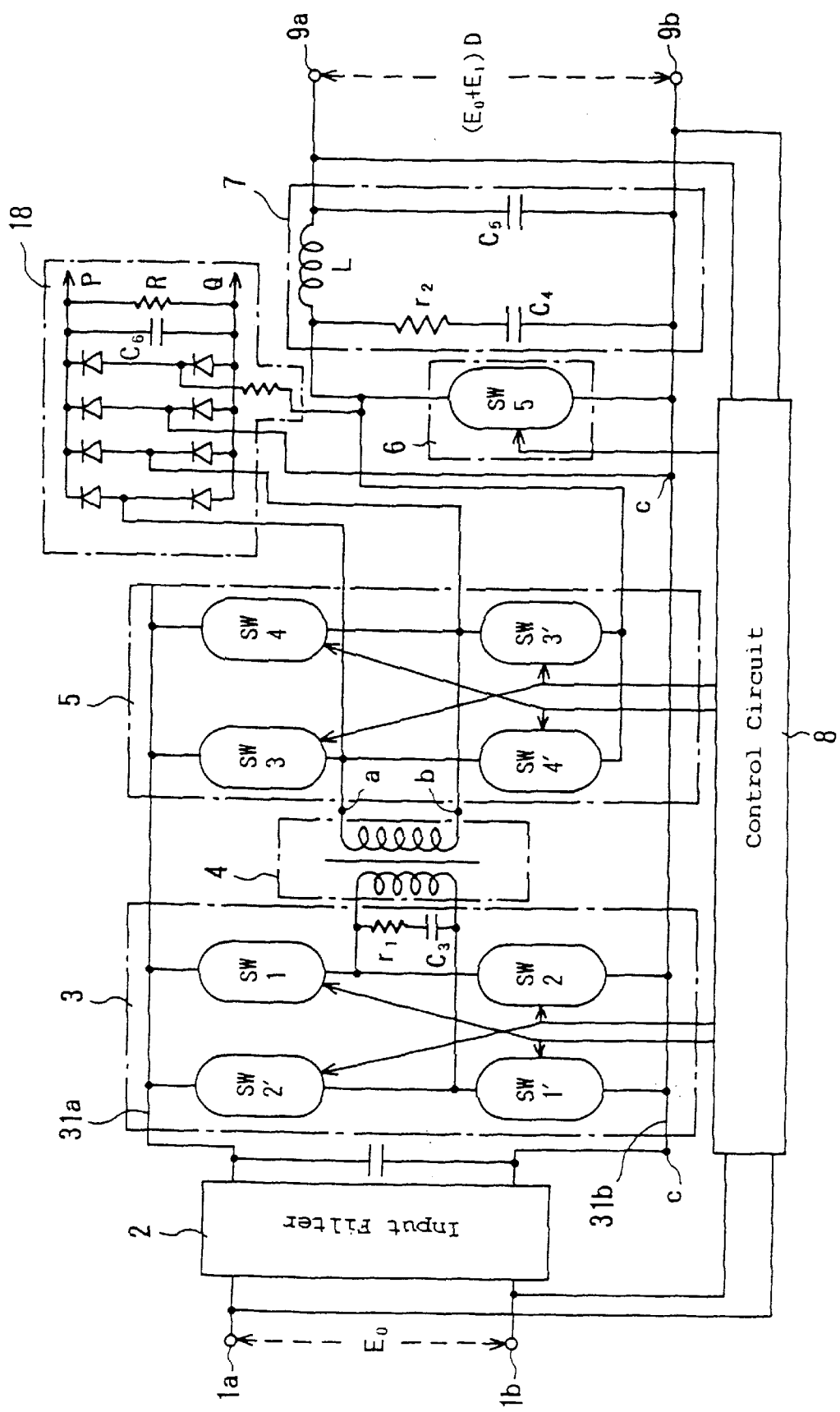
FIG. 10 is a circuit diagram of another preferred embodiment of an AC voltage regulator of the invention.

The above-described embodiment of FIG. 9 pertains to a configuration wherein the second bi-directional semiconductor switch circuit 5 is connected in a two-phase half-wave bridge. On the other hand, FIG. 10 shows a configuration wherein the second bi-directional semiconductor switch circuit 5 is connected in a single-phase full-wave bridge as shown in FIG. 8 of the second embodiment. The circuit configuration of the four-phase full-wave rectifier 18 is the same configuration as in FIG. 9, and reduction of spike pulses can be realized in the same way.

(Embodiment 5)

Figure 11:
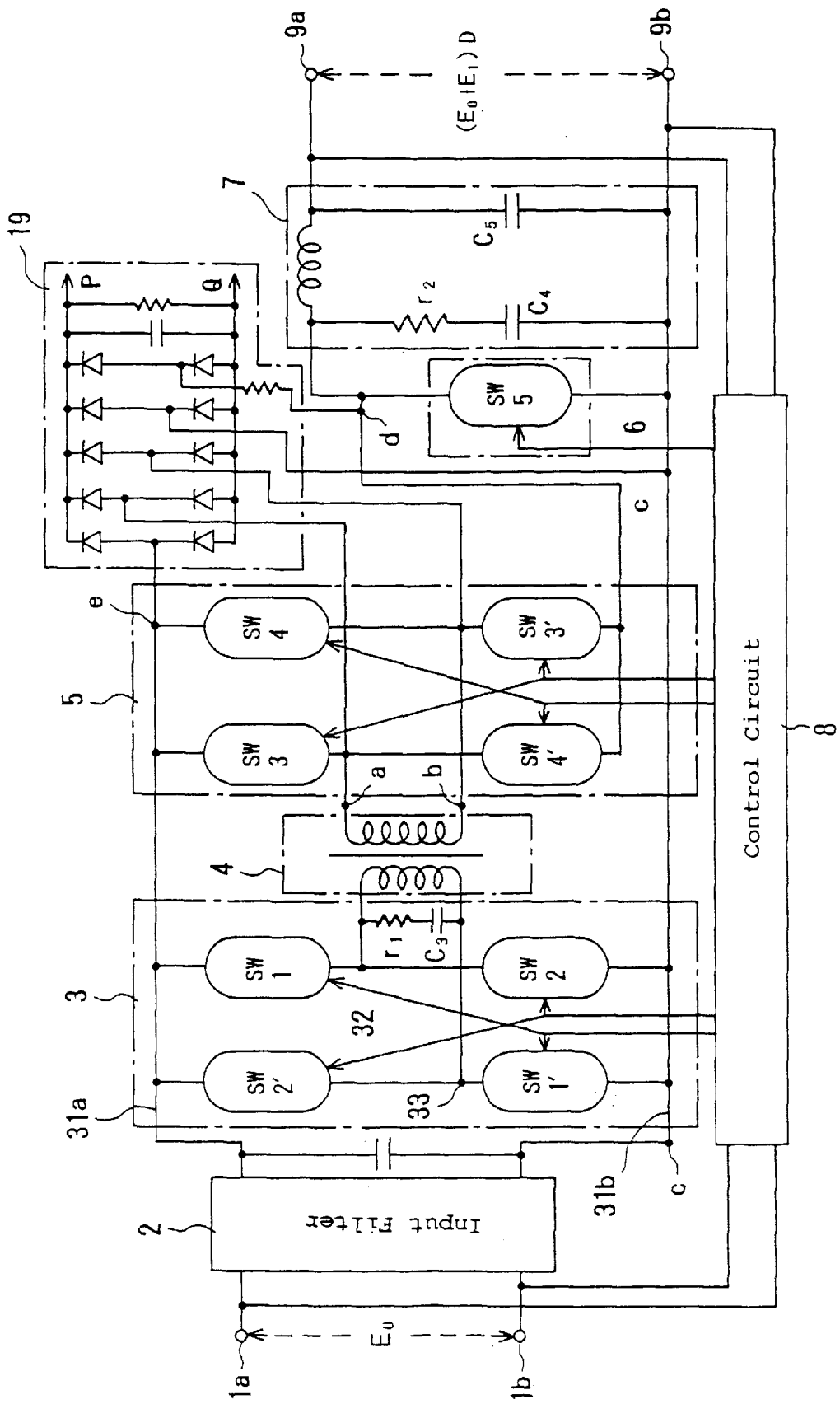
FIG. 11 is a circuit diagram of another preferred embodiment of an AC voltage regulator of the invention.

FIG. 11 shows an example wherein a five-phase full-wave rectifier 19 is provided instead of the four-phase full-wave rectifier 18. The five-phase full-wave rectifier 19 has its five AC input terminals connected, respectively, to the output terminals a and b of the high-frequency transformer 4, the input-output common terminal c, the raised voltage terminal d and an output terminal e of the second bi-directional semiconductor switch circuit 5 and also has a capacitor C6 for absorbing spikes and a discharge resistor R connected in parallel to its DC output side.

With this five-phase full-wave rectifier 19, it is also possible to realize reduction of spike pulses and reduction of losses of the rectifier as a whole, in the same way as with the four-phase full-wave rectifier 18.

(Embodiment 6)

Figure 12:
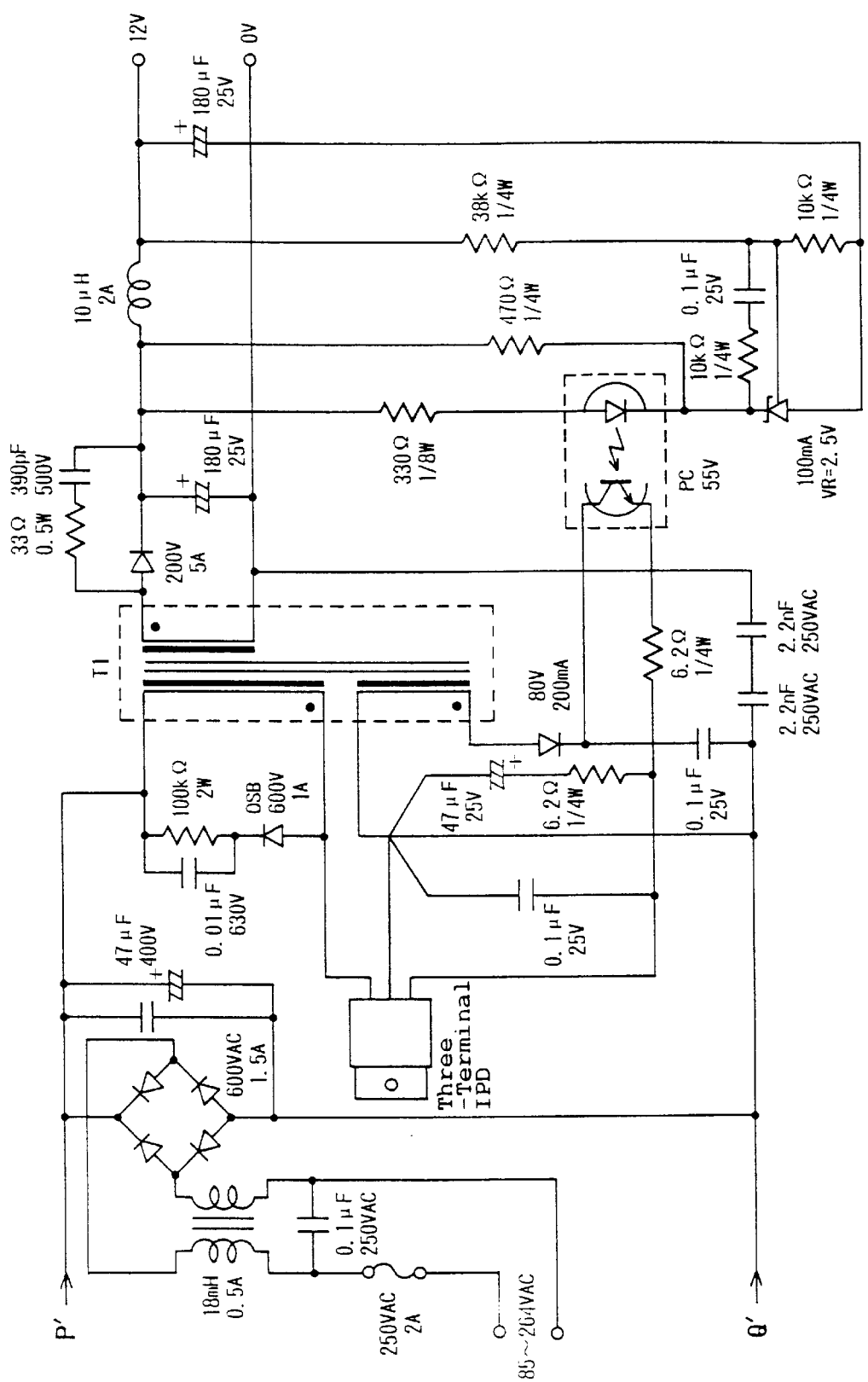
FIG. 12 is a circuit diagram of an example of a control circuit in an AC voltage regulator according to the invention.

The control circuit 8 in the AC voltage regulator of the invention, for example as shown in FIG. 12, may use a switching power supply available in general. In such a configuration, generally, a high-voltage primary circuit and a low-voltage secondary circuit are completely insulated from each other. Therefore, instead of inserting the discharge resistor R for reducing spike pulses in the four-phase full-wave rectifier 18 or five-phase full-wave rectifier 19, by connecting, respectively, the output terminals P and Q of the rectifier 18 or 19 to the input terminals P' and Q' of the control circuit 8 shown in FIG. 12 (in FIG. 12, the input terminals P' and Q' are connected to the output terminals of the full-wave bridge circuit of the high-voltage primary circuit side), wasteful consumption of power can be suppressed and the efficiency of the regulator under light loads can be improved. That is, when the control circuit 8 is operated with a power supplied from the DC input side at turn-on of the regulator and circuit portions other than the control circuit 8 starts its operation and a load is applied, spike pulses increase and the rectified voltage of the spike pulse reducing circuit becomes higher than the rectified output of the input power supply. Consequently, most of the power of the control circuit 8 is supplied from the spike pulse reducing circuit, and power consumption can be suppressed.

In experimental results obtained with the AC voltage regulators of the invention as described above, it has been confirmed that for example a weight of 4 kg or less, efficiency of 92% at maximum output and a power factor of 98% can be obtained. Of course, these values are only examples, and the figures obtained differ according to the configurations described above, but in all cases, compared to the prior art AC voltage regulators of the mechanical control type and electronic control type described above, it is possible to realize a AC voltage regulator small in size and light in weight, with an excellent efficiency and power factor, and capable of smooth automatic regulation of voltage.

Figure 2:
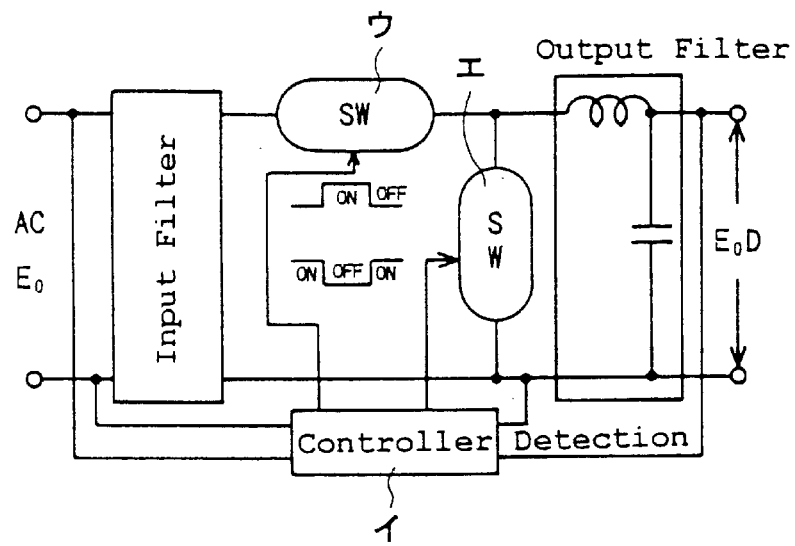
FIGS. 2(a) and 2(b) are circuit diagrams of a prior art AC voltage regulators of electronic control type.
Figure 2:
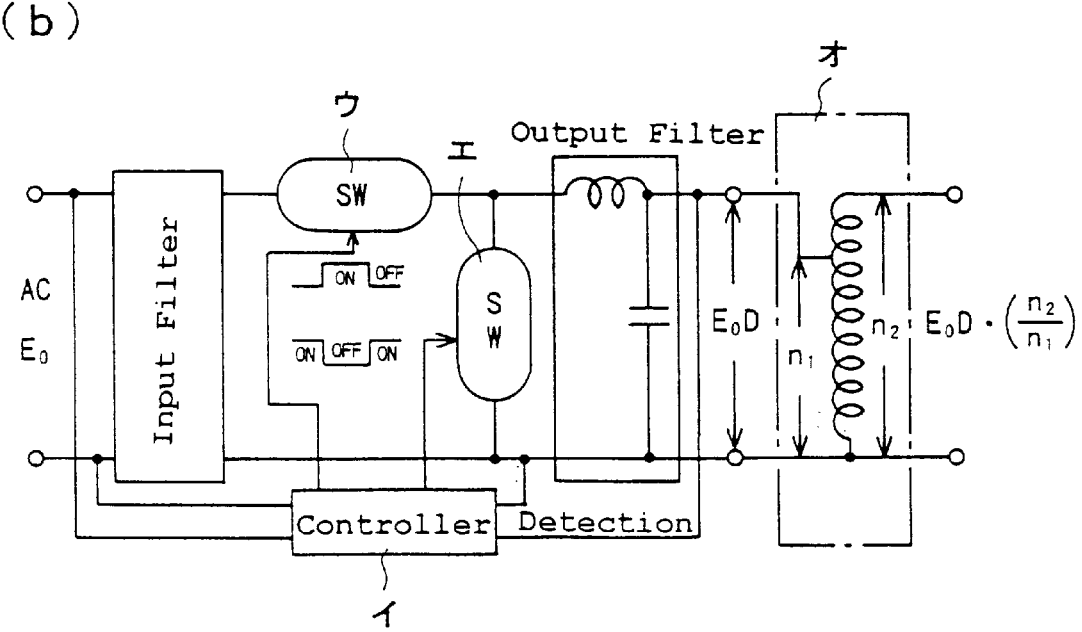

As described in detail above, since the AC voltage regulator of the invention has its voltage control portion made up of high-frequency, high-speed switching devices and high-frequency transformers and high-frequency filters, it is very small in size and light in weight, and excels in both an efficiency and a power factor, compared to the prior art. And, the regulator of the invention has an automatic voltage regulating function capable of carrying out smooth, free setting of an AC output voltage from substantially zero up to a maximum voltage, and also has a so-called constant voltage function capable of holding a stable set voltage at all times even with respect to normally occurring fluctuations of a received voltage and wide fluctuations of a load. In addition, whereas the AC voltage regulator of the prior art using a low-frequency step-up transformer in FIG. 2 is semi-electronic control, the AC voltage regulator of the invention can be made fully electronic control, thus its response speed is markedly faster than that of the prior art.

Accordingly, in experimental data sampling in a laboratory or the like for example, it is not necessary to finely adjust its setting in occurrence of a received voltage fluctuation or a load fluctuation, thereby reducing a measurement time. Thus, compared with the prior art, the AC voltage regulator of the invention is extremely easier to use, and is extremely useful as a power supply for various types of automatic testing in experimental data sampling and at production sites and the like.

Further, since the regulator of the invention uses modulation and demodulation technology in principle, it is possible to realize a high-speed control with respect to any input-frequency in a range from direct current up to 1/20 of modulation frequency, and also a voltage stabilization and a remote control of a set voltage of equipment in which a wide-range fluctuation of rotating number (frequency) or generated voltage are anticipated, such as a wind generator and a engine generator.

Recent advances in power semiconductors, particularly in MOS-FETs and IGBTs, have been remarkable, and devices with a high withstandable voltage, low on resistance and high speed have been developed. By using these devices, the AC voltage regulator of the invention can be made still smaller, lighter, and more efficient, and can be used in an even wider range of applications.

While the invention has been described in detail and with reference to specific embodiments thereof, it will be apparent to one skilled in the art that various changes and modifications can be made therein without departing from the spirit and scope thereof.

What is claimed is:

1. An AC voltage regulator comprising:
    a high-frequency transformer, a first bi-directional semiconductor switch circuit, a second bi-directional semiconductor switch circuit and a third bi-directional semiconductor switch circuit;
    wherein an input AC voltage is ring-modulated by said first bi-directional semiconductor switch circuit to obtain a ring-modulated voltage, and the ring-modulated voltage is transformed at a high frequency by said high-frequency transformer and then demodulated by said second bi-directional semiconductor switch circuit to obtain an AC demodulated voltage, and the AC demodulated voltage is added to the input AC voltage to obtain an AC raised voltage, and the AC raised voltage is pulse width modulated by said third bi-directional semiconductor switch circuit, which is controlled to become ON only while said second bi-directional semiconductor switch circuit is OFF, and the AC raised voltage is continuously regulated by continuous regulation of a duty ratio D of said second bi-directional semiconductor switch circuit in the pulse width modulation.

2. The AC voltage regulator according to claim 1, wherein said second bi-directional semiconductor switch circuit comprises a two-phase half-wave bridge connection or a single-phase full-wave bridge connection on a secondary side of said high-frequency transformer.

3. The AC voltage regulator according to claim 1 further comprising a four-phase full-wave to serve as a spike pulse reducing circuit, which has four AC input terminals thereof connected, respectively, to two output terminals of a secondary coil of said high-frequency transformer, a common terminal of an AC voltage input terminal and an AC voltage output terminal, and a terminal at which an AC raised voltage is obtained, and also has a spike-absorbing capacitor and a discharge resistance connected in parallel with a output side thereof.

4. The AC voltage regulator according to claim 1 further comprising a five-phase full-wave rectifier to serve as a spike pulse reducing circuit, which has five AC input terminals thereof connected, respectively, to two output terminals of a secondary coil of said high-frequency transformer, a common terminal of an AC voltage input terminal and an AC voltage output terminal, a terminal at which an AC raised voltage is obtained, and an output terminal of said second bi-directional semiconductor switch circuit, and also has a spike-absorbing capacitor and a discharge resistance connected in parallel with a DC output side thereof.

5. The AC voltage regulator according to claim 3, further comprising a control circuit for performing pulse width control of said first bi-directional semiconductor switch circuit, said second bi-directional semiconductor switch circuit and said third bi-directional semiconductor switch circuit, wherein a DC output terminal of said four-phase full-wave rectifier is connected to a DC voltage power supply of said control circuit and energy for spike pulse discharge is used in driving said control circuit.

6. The AC voltage regulator according to claim 4, further comprising a control circuit for performing pulse width control of said first bi-directional semiconductor switch circuit, said second bi-directional semiconductor switch circuit and said third bi-directional semiconductor switch circuit, wherein a DC output terminal of said five-phase full-wave rectifier is connected to a DC voltage power supply of said control circuit and energy for spike pulse discharge is used in driving said control circuit.

7. The AC voltage regulator according to claim 2, further comprising a four-phase full-wave to serve as a spike pulse reducing circuit, which has four AC input terminals thereof connected, respectively, to two output terminals of a secondary coil of said high-frequency transformer, a common terminal of an AC voltage input terminal and an AC voltage output terminal, and a terminal at which an AC raised voltage is obtained, and also has a spike-absorbing capacitor and a discharge resistance connected in parallel with a output side thereof.

8. The AC voltage regulator according to claim 2, further comprising a five-phase full-wave rectifier to serve as a spike pulse reducing circuit, which has five AC input terminals thereof connected, respectively, to two output terminals of a secondary coil of said high-frequency transformer, a common terminal of an AC voltage input terminal and an AC voltage output terminal, a terminal at which an AC raised voltage is obtained, and an output terminal of said second bi-directional semiconductor switch circuit, and also has a spike-absorbing capacitor and a discharge resistance connected in parallel with a DC output side thereof.

\* \* \* \* \*